US010826777B2

(12) United States Patent
Groves et al.

(10) Patent No.: US 10,826,777 B2
(45) Date of Patent: Nov. 3, 2020

(54) TECHNIQUES FOR PASSIVELY GLEANING PROPERTIES OF COMPUTING ENTITIES

(71) Applicant: A10 Networks, Incorporated, San Jose, CA (US)

(72) Inventors: Vernon Richard Groves, Seattle, WA (US); Eric Chou, Issaquah, WA (US); Bill Benetti, Leeburg, VA (US)

(73) Assignee: A10 NETWORKS, INCORPORATED, San Jose, CA (US)

( * ) Notice: Subject to any disclaimer, the term of this patent is extended or adjusted under 35 U.S.C. 154(b) by 110 days.

(21) Appl. No.: 14/747,399

(22) Filed: Jun. 23, 2015

(65) Prior Publication Data

US 2016/0380827 A1     Dec. 29, 2016

(51) Int. Cl.
  *H04L 29/00* (2006.01)
  *H04L 12/24* (2006.01)
  *H04L 29/08* (2006.01)
  *H04L 29/06* (2006.01)

(52) U.S. Cl.
  CPC .......... *H04L 41/12* (2013.01); *H04L 63/0209* (2013.01); *H04L 63/20* (2013.01); *H04L 67/10* (2013.01)

(58) Field of Classification Search
  CPC ......... H04L 41/12; H04L 63/20; H04L 67/10; H04L 29/06578; H04L 29/06986; H04L 63/0227; H04L 63/0254; G06F 21/10
  See application file for complete search history.

(56) References Cited

U.S. PATENT DOCUMENTS

| | | | | |
|---|---|---|---|---|
| 6,301,668 | B1 * | 10/2001 | Gleichauf | H04L 41/12 726/22 |
| 6,324,656 | B1 * | 11/2001 | Gleichauf | H04L 41/12 714/37 |
| 9,306,806 | B1 * | 4/2016 | Zhang | H04L 41/0866 |
| 2003/0046390 | A1 * | 3/2003 | Ball | H04L 41/12 709/224 |

(Continued)

*Primary Examiner* — Jeffrey C Pwu
*Assistant Examiner* — Helai Salehi

(57) ABSTRACT

In response to communications between one or more given networks and one or more other networks, a network protection appliance discovers one or more computing resources of the one or more given networks from a plurality of protocol layers of the received communications. The network protection appliance also gleans properties of the one or more discovered computing resources of the one or more given networks from the plurality of protocol layers of the received communications. The network protection appliance maps the gleaned properties of the one or more discovered computing resources of the one or more given networks to a plurality of network protection policies. The network protection appliance also determines an applicable network protection policy for processing a corresponding received communication from the mapping of the gleaned properties of the one or more discovered given computing resources of the one or more given networks to the plurality of network protection policies. Thereafter, the network protection appliance applies the applicable network protection policies to the corresponding received communication between a computing resource of a given network and a computing resource of the other network.

8 Claims, 5 Drawing Sheets

(56) References Cited

U.S. PATENT DOCUMENTS

2012/0102143 A1* 4/2012 Mandre ............... H04L 63/0478
                   709/217
2013/0275574 A1* 10/2013 Hugard, IV ............ H04L 63/00
                   709/224

* cited by examiner

TECHNIQUES FOR PASSIVELY GLEANING PROPERTIES OF COMPUTING ENTITIES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment education, business, and science. One common aspect of computing systems is communicating such information between computing devices across diverse networks.

Computing devices and communication protocols allow the devices to be communicatively coupled in virtually any possible arrangement. In addition, computing device can be communicatively coupled across networks to computing resources or numerous known and unknown entities. However, as the diversity of network topologies continues to increase it becomes ever more important to characterize the networks and provide security for various computing resources in the networks.

SUMMARY OF THE INVENTION

The present technology may best be understood by referring to the following description and accompanying drawings that are used to illustrate embodiments of the present technology directed toward network communication methods and apparatuses.

In one embodiment, a network protection appliance is communicatively coupled between one or more given networks and one or more other networks. The network protection appliance is adapted to receive communications between the one or more given networks and the one or more other networks. The network protection appliance discovers one or more computing resources, and gleans properties of the one or more discovered computing resources of the one or more given networks from a plurality of protocol layers of the received communications. In addition, the network protection appliance may discover one or more other computing resources, and glean properties of the one or more discovered other computing resources of the one or more other networks from the plurality of protocol layers of the received communications. The network protection appliance then maps the gleaned properties of the one or more discovered computing resources of the one or more networks to a plurality of network protection policies. Concurrently, the network protection appliance determines one or more network protection policies for processing the received communications from the mapping of the gleaned properties of the one or more discovered computing resources of the one or more networks to the plurality of network protection policies, and applies the determined network protection policies to the received communications.

In another embodiment, a computing device communication method includes receiving communications into and out of a security zone. One or more computing resources within the security zone are discovered from a plurality of protocol layers of the received communications. Properties of the one or more discovered computing resources within the security zone are also gleaned from the plurality of protocol layers of the received communications. One or more computing resources outside of the security zone may also be discovered. In such case, properties of the one or more computing resource outside of the security zone are also gleaned from the plurality of protocol layers of the received communications. The gleaned properties of the one or more discovered computing resources are mapped to a plurality of network protection policies. The method also includes determining an applicable network protection policy for processing a corresponding received communications from the mapping of the gleaned properties of discovered computing resources to the plurality of network protection policies. The determined network protection policy is then applied to the corresponding received communications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
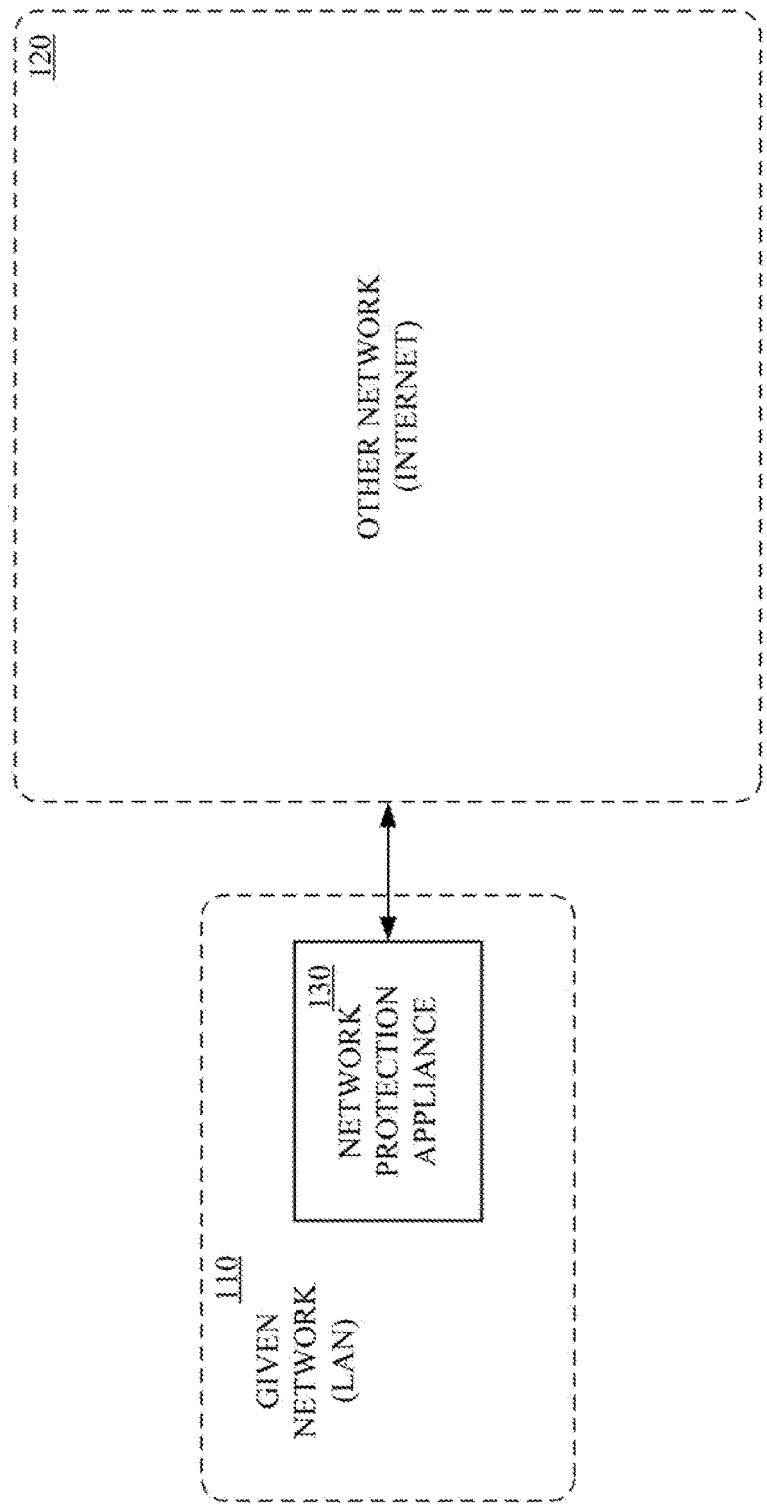
FIG. 1 illustrates an exemplary computing environment for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

FIG. 1 illustrates an exemplary computing environment for implementing embodiments of the present technology. The computing environment includes one or more given computing networks 110 coupled to one or more other computing networks 120. The one or more given computing networks 110 may include local area networks, wide area networks, intranets, perimeter networks and the like, and any combination thereof. Likewise, the one or more other computing networks 120 may include local area networks, wide area networks, intranets, perimeter networks, the Internet, and the like, and any combination thereof. For example, a given computing network 110 may be a local area network and the other networks 120 may comprise the Internet. Each of the computing networks includes one or more computing resources. The one or more given networks 110 are communicatively coupled to the other networks 120 by one or more network protection appliances 130. The network protection appliance may be inside the security zone of the one or more given computing networks or disposed between the security zone of the one or more given computing networks and the one or more other networks. The network protection appliance may be a separate computing resource or may integral to another computing resource.

The network protection appliance 130 is communicatively coupled between the one or more given networks 110 and the one or more other networks 120 and therefore receives all network traffic between the networks. The communications between the networks conform to one or more communication standards that are based upon the open system interconnect (OSI) model.

Figure 2:
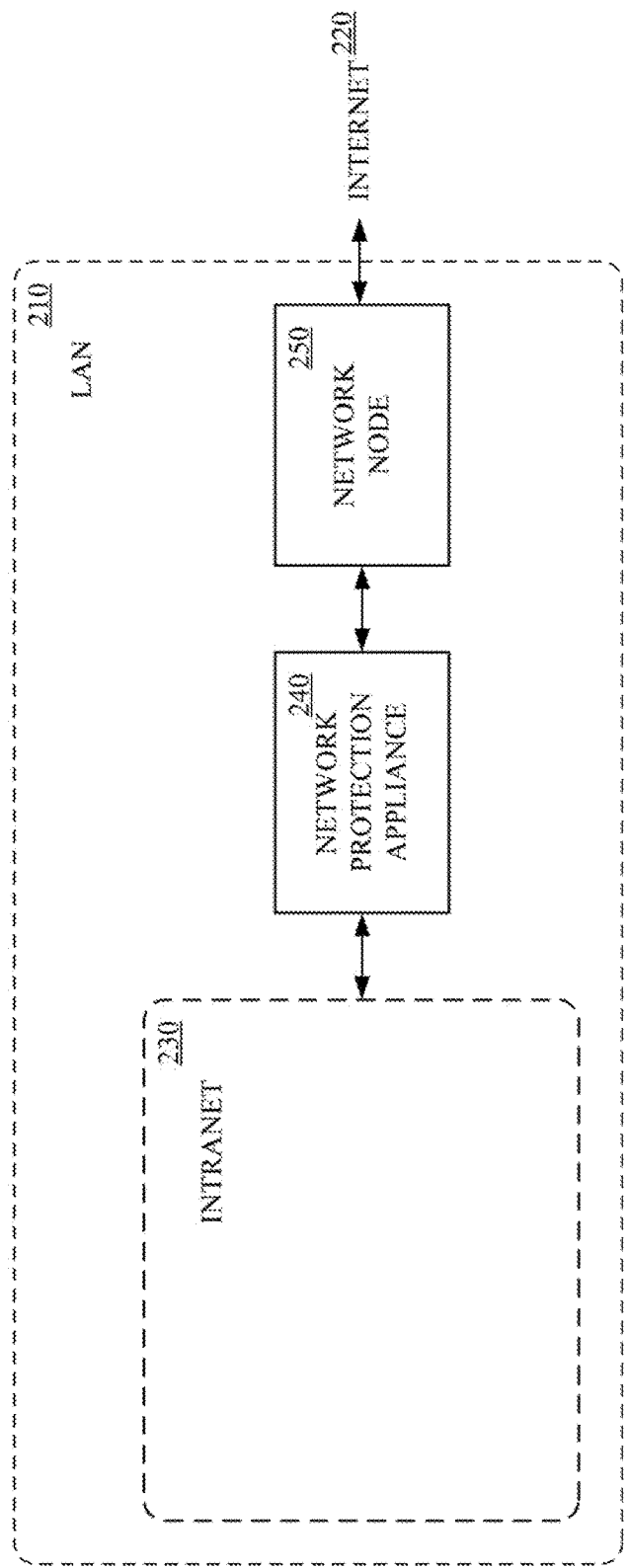
FIG. 2 illustrates another exemplary computing environment for implementing embodiments of the present technology.

Referring now to FIG. 2, another exemplary computing environment tor implementing embodiments of the present technology is illustrated. Again, the computing environment includes one or more given computing networks, coupled to one or more other computing networks by one or more network protection appliances. In this example, the one or more given networks may include a local area network 210 coupled to the Internet 220. The local area network 210 may include one or more intranets 230 communicatively coupled through a network protection appliance 240 and a firewall/router 250 to the Internet 220. Again, the network protection appliance 240 may be a separate computing resource as illustrated, or may integral to another computing resource. The firewall/router 250 may for example implement the network protection appliance 240 in accordance with embodiments of the present technology, along with other conventional functions of firewalls.

Again, the network protection appliance 240 is communicatively coupled between the one or more given networks and the one or more other networks and therefore receives all network traffic between the networks. The communications between the networks conform to one or more communication standards that are based upon the open system interconnect (OSI) model.

Figure 3:
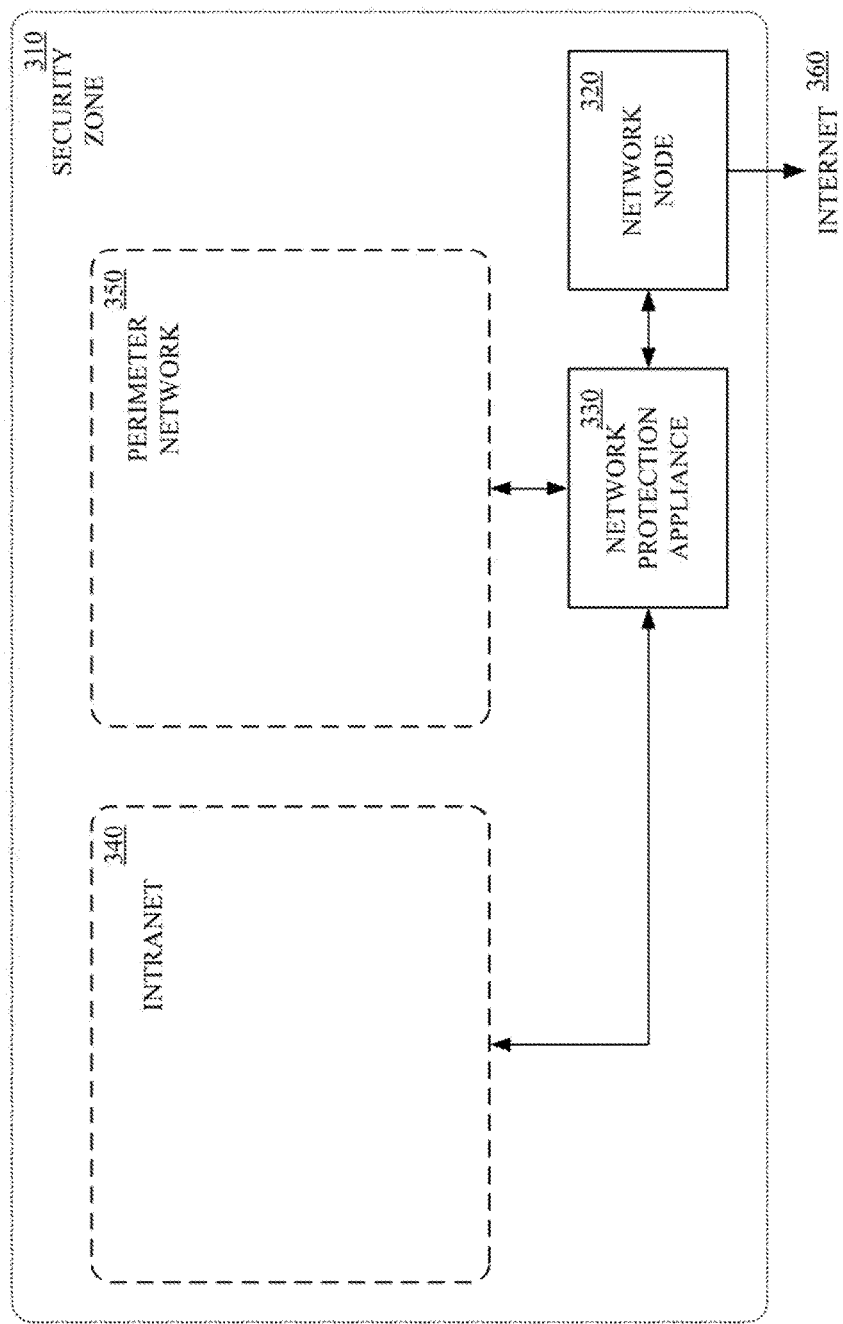
FIG. 3 illustrates another exemplary computing environment for implementing embodiments of the present technology.

Referring now to FIG. 3, another exemplary computing environment for implementing embodiments of the present technology is illustrated. In this example, the one or more given networks represent a security zone 310 that includes one or more network nodes 320, one or more network protection appliances 330, one or more intranets 340 and one or more perimeter networks 350.

The intranets 340 are subnetworks that contain internal resources. The intranet resources may include database servers, desktop computers, laptop computers and the like. The perimeter networks 350 are subnetworks that contain and exposes external-facing resources to another network that may not be trusted, such as the internet 360. The perimeter networks add an additional layer of security to the given network or security zone, wherein an external network node only has direct access to resources in the perimeter network. The perimeter network resources may include web servers, mail servers, filed transfer protocol (FTP) servers, domain name system (DNS) servers, voice over internet protocol (VoIP) servers, proxy servers, firewall servers and/or the like.

Figure 4:
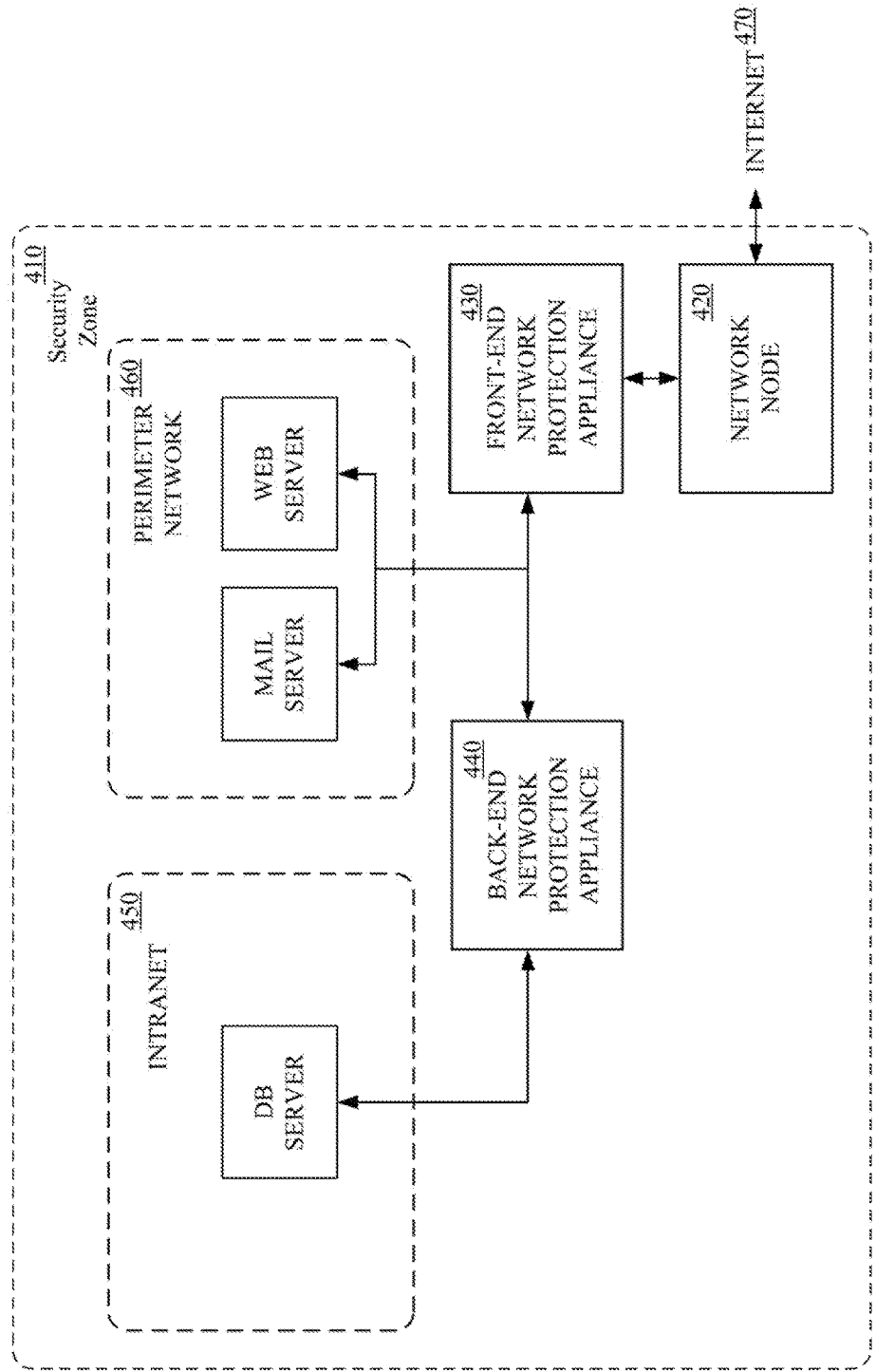
FIG. 4 illustrates yet another exemplary computing environment for implementing embodiments of the present technology.

Referring now to FIG. 4, yet another exemplary computing environment for implementing embodiments of the present technology is illustrated. In this example, the one or more given networks represent a security zone 410 that includes one or more network nodes 420, one or more network protection appliances 430, 440, one or more intranets 450 and one or more perimeter networks 460.

The front-end network protection appliance 430 is configured to allow traffic between the perimeter network 460 and any external networks 470. For example, the front-end network appliance may be a firewall configured to allow traffic between the web server and mail server of an organization's perimeter network and the internet. The back-end network appliance 440 is configured to allow traffic between the perimeter network 460 and the intranet 450. For example, the back-end network protection appliance 440 may be a firewall configured to allow traffic between the web servers and mail servers of the organization's perimeter network 460 and the database server of the organization's intranet 450. The front-end network protection appliance and back-end network protection appliance may be selected from different vendors to improve security, because it makes it less likely that both network appliances suffer from the same security vulnerabilities. In such cases, embodiments of the present technology may be implemented on one, or the other, or both of the network protection appliances.

The one or more network protection appliances 130, 240, 330, 430, 440, in accordance with embodiments of the present technology, are charged with the protection of the computing resources of the one or more given networks. The network protection appliance may be a router, firewall, application delivery controller, load balancer, or the like, and combinations thereof. In order to provide protection, the network protection appliance needs an understanding of various properties of the one or more given networks and the computing resources thereof. The network protection appliance also typically needs an understanding of various properties of the other networks.

Figure 5:
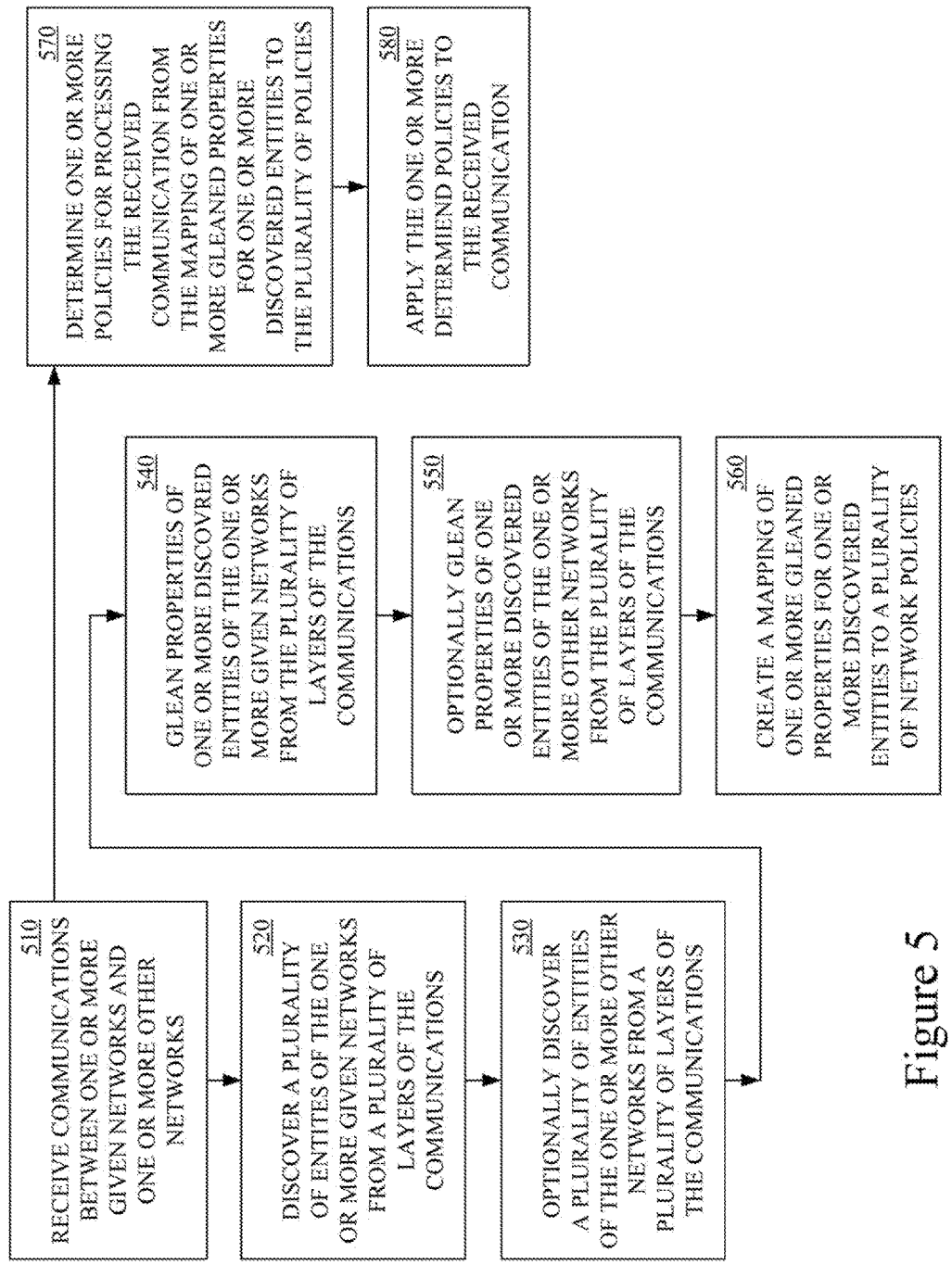
FIG. 5 illustrates a method of operation of a network protection appliance, in accordance with embodiments of the present technology.

Referring now to FIG. 5, a method of operation of a network protection appliance, in accordance with embodiments of the present technology, is shown. The method may be implemented as computing device-executable instructions (e.g., computer program) that are stored in computing device-readable media (e.g., computer memory) and executed by a computing device (e.g., processor). The method includes receiving communications between one or more given networks and one or more other networks, at 510. The one or more given networks are those networks within a security zone that the network protection appliance is primarily adapted to provide protection for. The one or more other networks are those networks outside the security zone that the network protection appliance is not intended to directly protect, but may none the less provide protection.

The communications between the network devices is received by a network protection appliance such as a firewall, gateway, or the like. The communications between the network devices are implemented in accordance with a multilayer communication model, such as the open system (OSI) model, internet protocol suite, or the like. For example, the OSI model includes a seven logical abstraction layers of the communication protocol, that includes a physical layer, data link layer, network layer, transport layer, session layer, presentation layer and application layer.

At 520, the identities of a plurality of entities of the one or more given networks are discovered from a plurality of layers of the received communications. At 530, the identities of a plurality of entities of the one or more other networks may also be discovered from the plurality of layers of the received communications. For example, the network protection appliance discovers entities of the one or more given networks, and optionally the one or more other networks, from hints in layers 2-7 of the one or more communication protocol of the OSI model, or similar layers in similar networking models. Hints from various control mechanism in layers 2-7 may be utilized to determine entities participating in the one or more given networks.

At 540, properties of the one or more discovered entities of the one or more given networks are gleaned from the plurality of layers of the received communications. If entities of the one or more other networks were discovered, properties of such entities may also be gleaned from the plurality of layers of the received communications, at 550. The network protection appliance also gleans properties of the discovered entities of the one or more given networks, and optionally the one or more other networks, from hints in layers 2-7 of the one or more communication protocols corresponding to the OSI model, or similar layers in similar networking models. Again, hints from various control mechanism in layers 2-7 may also be utilized to glean properties about entities participating in the one or more given networks.

In one implementation, for example, when given a feed of address resolution protocol (ARP) activity within a network, the network protection appliance may glean currently active end nodes in the computing environment of the one or more given networks. ARP is a communication protocol that converts a network address, such as an IPv4 address, to a physical address, such as an Ethernet media access control (MAC) address. ARP messages each contain one address resolution request or response, which includes the address of the host sending the request, the internetwork address of the sender, the media address of the intended receiver, and the internetwork address of the intended receiver. Accordingly, the network protection appliance can determine the identity of a sender based upon the MAC address and its IP address of the sender in a received request or announcement packet. The network protection appliance may also determine the identity of a target if the request packet also includes the MAC address and IP address of the target. Alternatively, the network protection appliance can determine the identity of the send and target based upon their respective MAC and IP address received in a response ARP packet.

In another example, the network protection appliance may glean nodes, links connecting them to one another and metadata about the nodes and functions thereof from a feed of discovery protocols embodied in received communications such as but not limited to link layer discovery protocol (LLDP), Cisco discovery protocol (CDP) or the like. For instance, LLDP is data link (e.g., layer 2) protocol is used to advertise the identity, capabilities of an entity and its neighbors. CDP is a data link layer protocol which shares information about other connected equipment, such as the operating system version, host name, IP address, port identifier, device type, device model and the like of an entity.

In yet another example, when given a feed of dynamic host configuration protocol (DHCP) traffic from the network, the network protection device can discover entities from active end node addresses and further metadata about the properties of the end node. For example, DHCP is a network (e.g., layer 3) protocol for dynamically distributing network configuration parameters, such as addresses of interface and services.

In yet another example, the network protection appliance may receive the routing table from the interior gateway protocol (IGP) and/or the border gateway protocol (BGP), from which addresses that should be considered trusted and/or untrusted, as well as systems in need of further protection and their extended properties can be determined. For instance, the IGP protocol is used for the exchange of routing information between gateways within the one or more given networks within a security boundary. The routing information of IGP protocols, such as open short path first protocol, routing information protocol, and intermediate system to intermediate system protocol, is used at network-level (e.g., layer 3). The BGP protocol is used to exchange routing and reachability information between one or more networks across and/or within the security boundary.

In yet another example, the network protection appliance may determine potentially active transport, layer ports and protocols per end node from a stream of internet control message protocol (ICMP). The ICMP is used by network devices to send error, diagnostic and/or control massages to a source IP address of the originating packet. In yet another example, a stream of control traffic in a transport layer allows the network protection appliance to determine layer 4 ports with active services. In still another example, a view of application layer databases, such as domain name system (DNS) database, allows the network protection apparatus to determine end nodes which have been given network names. The DNS is a hierarchical distributed naming system of computers, services or any resources connected to the one or more networks. The DNS database maps names more recognizable by users to numerical IP address utilized by computing resources. This enables the network protection apparatus to glean network addresses which have been made easier to access which implies a different level of trust.

At 560, one or more gleaned properties of the one or more discovered entities are mapped to a plurality of network protection policies. The mapping may be implemented in a computing device readable data, structure stored in a computing device readable media. The processes at 510-560 are adapted to dynamically configure the network protection appliance. The processes allow the network protection appliance to glean knowledge of what it is required to protect in the one or more given networks through an understanding of its own environment.

In response to the received communications, one or more applicable policies for processing the corresponding received communications are also determined from the mapping of one or more gleaned properties for one or more discovered entities to the plurality of network protection policies, at 570. At 580, the one or more applicable network protection policies are applied to the corresponding received communications. The processes at 510-570 may be performed passively without interaction with entities in the one or more given networks and/or the entities in the one or more other networks.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing system comprising:
a network protection appliance configured to communicatively couple one or more given networks to one or more other networks, such that all communications between the one or more given networks and the one or more other networks pass through said network protection appliance, without a bypass route around said network protection appliance,
wherein the network protection appliance is adapted to:
receive all communications between the one or more given networks and the one or more other networks, wherein said communications are not addressed to said network protection appliance,
discover one or more computing resources of the one or more given networks from a plurality of protocol layers of the received communications,
glean properties of the one or more discovered computing resources of the one or more given networks from the plurality of protocol layers of the received communications
map the gleaned properties of the one or more discovered computing resources of the one or more given networks to a plurality of network protection policies;
determine one or more network protection policies for processing the received, communications from the mapping of the gleaned properties of the one or more discovered given computing resources of the one or more given networks to the plurality of network protection policies, 'apply the one or more determined network protection policies to the received communications: and
wherein the network protection appliance is further adapted to;
discover one or more other computing resources of the one or more other networks from the plurality of protocol layers of the received communications,
glean properties of the one or more discovered other computing resources of the one or more other networks from the plurality of protocol layers of the received communications, and
map the gleaned properties of the one or more discovered other computing resources of the one or more other networks to the plurality of network protection policies.

2. The computing system of claim 1, wherein the network protection appliance is further adapted to, determine the one or more network protection policies for processing the received communications from the mapping of the gleaned properties of the one or more discovered other computing resources of the one or more other networks to the plurality of network protection policies.

3. The computing system of claim 1, wherein the plurality of protocol layers of the received communications include a set of layers selected from a group consisting of a data link layer, a network layer, a transport layer, a session layer, a presentation layer and an application layer.

4. A computing device communication method comprising:
receiving, by a network protection appliance, communications into and out of a security zone, wherein said communications are constrained to pass through said network protection appliance;
discovering, by the network protection appliance, one or more computing resources within the security zone from a plurality of protocol layers of the received communications;
gleaning, by the network protection appliance, properties of the one or more discovered computing resources within the security zone from the plurality of protocol layers of the received communications;
determining, by the network protection appliance, an applicable network, protection policy for processing a corresponding received communications from the mapping of the gleaned properties of computing resources to the plurality of network protection policies;
applying, by the network protection appliance, the determined network protection policy to the corresponding received communications;
mapping, by the network protection appliance, the gleaned properties of the one or more discovered computing resources within the security zone to a plurality of network protection policies,
wherein said communications are not addressed to said network protection appliance; and discovering, by the network protection applause, one or more other computing resources outside the security zone from the plurality of protocol layers of the received communications;

gleaning, by the network protection appliance, properties of the one or more discovered other computing resources outside the security zone from the plurality of protocol layers of the received communications; and mapping, by the network protection appliance, wherein the gleaned properties of the one or more discovered other computing resources outside the security zone to the plurality of network protection policies.

5. The computing system of claim 4, wherein the plurality of protocol layers of the received communications include a set of layers selected from a group consisting of a data link layer, a network layer, a transport layer, a session layer, a presentation layer and an application layer.

6. One or more non-transitory computing device executable media storing computing device executable instructions that when executed by a computing device perform a method comprising:

receiving, by a network protection appliance, all communications between one or more given networks and one or more other networks, such that all communications between the one or more given networks and the one or more other networks pass through said network protection appliance, without a bypass route around said network protection appliance, wherein said communications are not addressed to said network protection appliance;

discovering, by the network protection appliance, identities of one or more computing resources of the one or more given networks from a plurality of protocol layers of the received communications;

gleaning, by the network protection appliance, properties of the one or more discovered computing resources of the one or more given networks from the plurality of protocol layers of the received communications mapping, by the network protection appliance, the gleaned properties of the one or more discovered computing resources of the one or more given networks to a plurality of network protection policies;

determining, by the network protection appliance, an applicable network protection policy for processing a corresponding received communication from the mapping of the gleaned properties of the one or more discovered given computing resources of the one or more given networks to the plurality of network protection policies;

applying, by the network protection appliance, the applicable network protection policies to the corresponding received communication between a computing resource of a given network and a computing resource of the other network: and discovering, by the network protection appliance, identities of one or more other computing resources of the one or more other networks from the plurality of protocol layers of the received communications;

gleaning, by the network protection appliance, properties of the one or more discovered other ocmputing resources of the one or more other networks from the pluraltiy of protocol layers of the received communications; and mapping, by the network protection appliance, the gleaned properties of the one or more discovered other computing resources of the one or more other networks to the plurality of the network protection policies.

7. The one or more non-transitory computing device executable media storing the computing device executable instructions that when executed by the computing device perform the method according to claim 6, further comprising: determining, by the network protection appliance, the applicable network protection policy for processing a corresponding received communications from the mapping of the gleaned properties of the one or more discovered other computing resources of the one or more other networks to the plurality of network protection policies.

8. The one or more non-transitory computing device executable media storing the computing device executable instructions that when executed by the computing device perform the method according to claim 6, wherein the plurality of protocol layers of the received communications include a set of layers selected from a group consisting of a data link layer, a network layer, a transport layer, a session layer, a presentation layer and an application layer.

* * * * *